July 16, 1940.     W. S. DIEHL     2,207,724
DEVICE FOR INCREASING THE INTERNAL AIR PRESSURE OF AIRCRAFT
Filed April 17, 1939     2 Sheets-Sheet 1
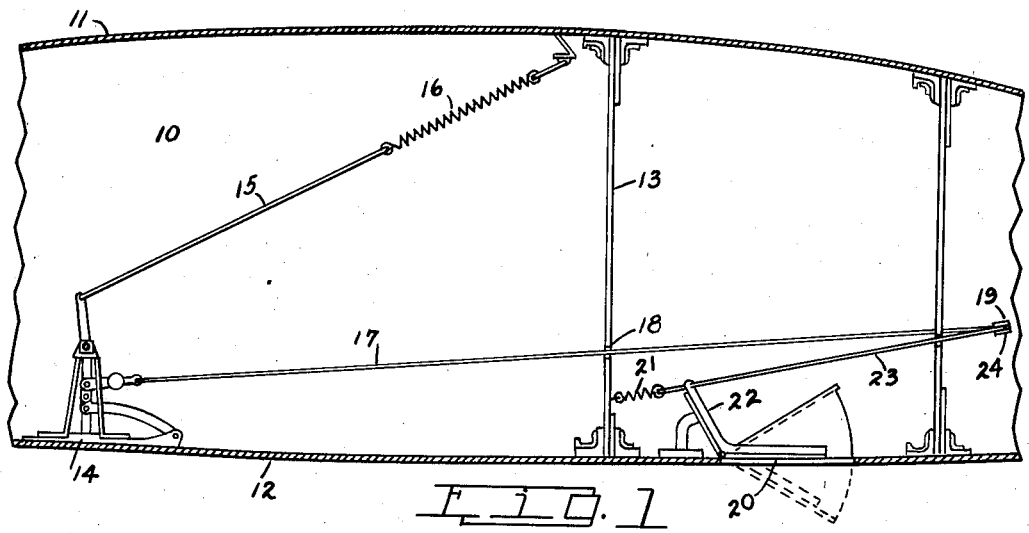
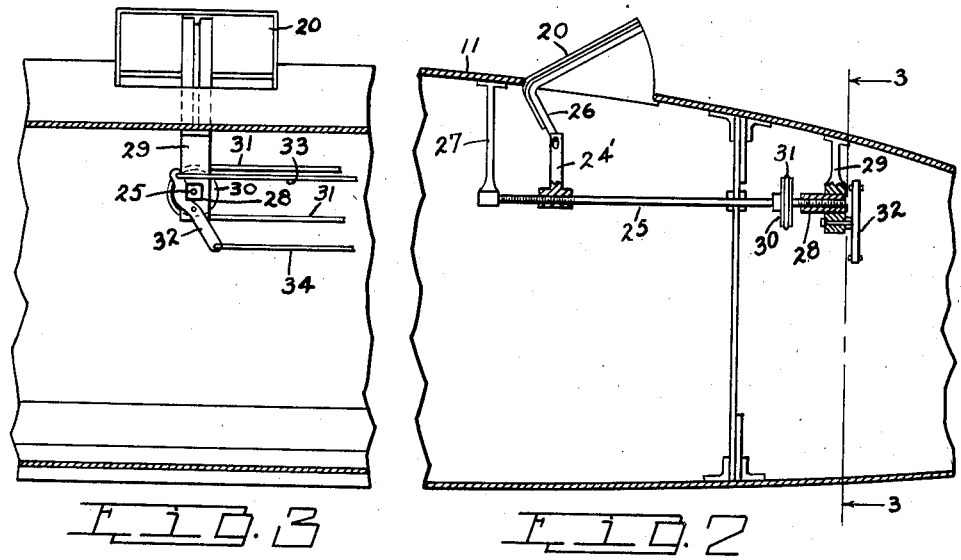
INVENTOR
WALTER S. DIEHL
BY
ATTORNEY

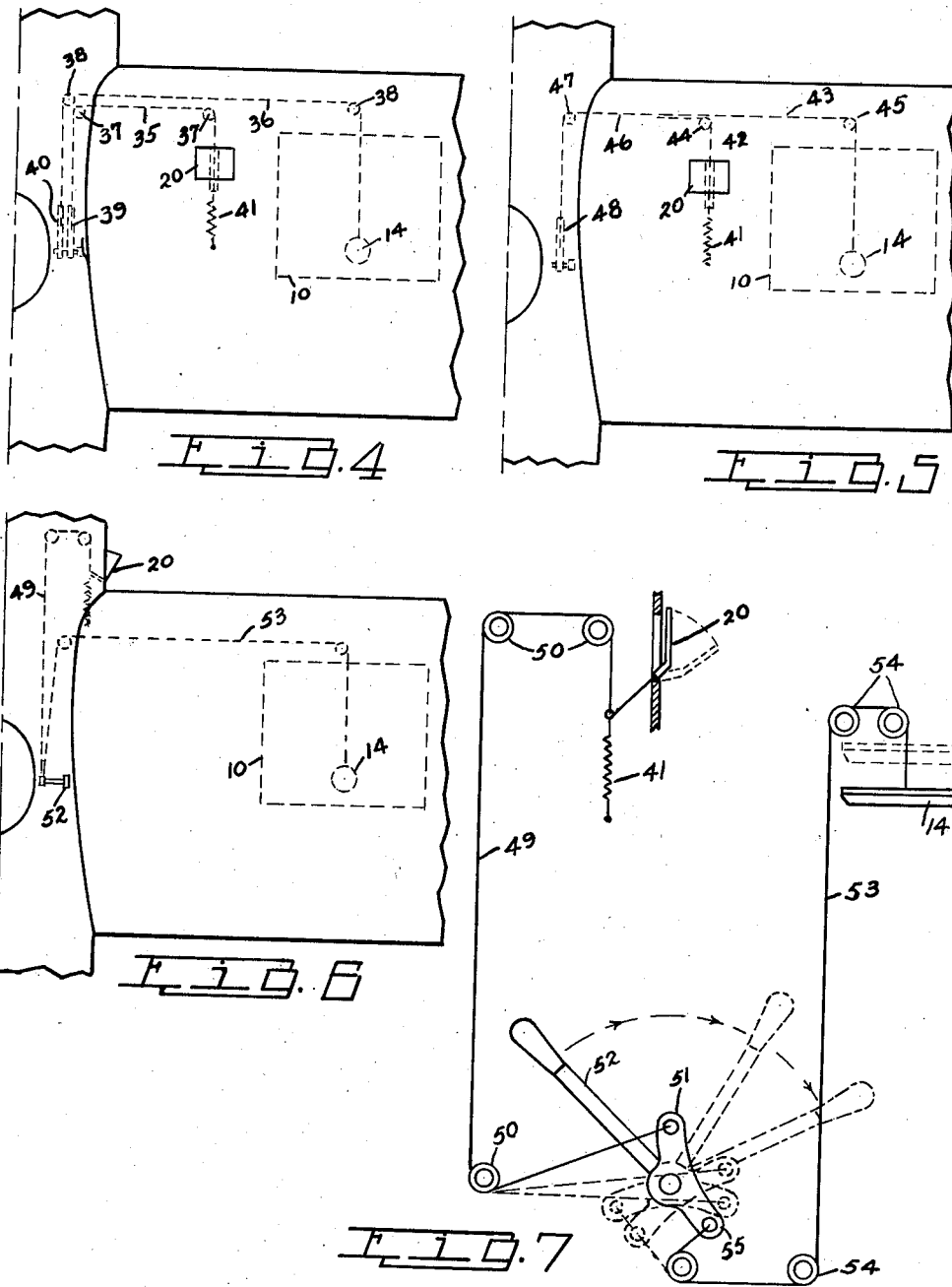

Patented July 16, 1940

2,207,724

UNITED STATES PATENT OFFICE 2,207,724

DEVICE FOR INCREASING THE INTERNAL AIR PRESSURE OF AIRCRAFT

Walter S. Diehl, United States Navy

Application April 17, 1939, Serial No. 268,324

3 Claims. (Cl. 244—135)

(Granted under the act of March 3, 1883, as amended April 30, 1928; 370 O. G. 757)

This invention relates to dumping fuel to lighten the load of aircraft in emergencies and it has for its principal object the provision of means for increasing the air pressure within the wings, fuselage and cabin of the aircraft during the dumping operation to prevent the entrainment and entry of combustible fuel thereinto.

Airplanes that are designed to carry loads of fuel are usually provided with one or more dump valves by means of which part of the fuel may be quickly disposed of in an emergency. In practice, it has been found that this dumping of fuel is hazardous, in that raw gasoline is carried into the airplane structure with a possibility of causing a violently explosive mixture. Various expedients have been attempted in order to eliminate this danger but they have thus far been unsuccessful. The reason that gasoline enters the wings, fuselage and tail structures is that small openings in the portions of a totally enclosed airplane places them at a reduced air pressure which is relieved by air flow laterally from the openings in the wings and forwardly from the openings in the tail and this air flow carries with it the dumped gasoline. This condition can be eliminated by reversing the direction of air flow which according to the present invention is obtained by providing one or more scoops in the wings and fuselage which are normally flush with the covering and located in high pressure areas. These air scoops are opened so as to build up the air pressure within the airplane either prior to or simultaneously with the opening of the dump valves.

With these and other objects in view, as well as other advantages that may be incident to the use of the improvements, the invention consists in the parts and combinations thereof hereinafter set forth and claimed, with the understanding that the several necessary elements constituting the same may be varied in proportion and arrangement without departing from the nature and scope of the invention, as defined in the appended claims.

In order to make the invention more clearly understood, there are shown in the accompanying drawings, means for carrying the invention into practical use, without limiting the improvements in their useful application to the particular construction, which, for the purpose of explanation, have been made the subject of illustration.

In the accompanying drawings:

Fig. 1 is a fragmentary transverse sectional view through the fuel tank portion of an airplane wing showing the air scoop in the lower surface of the wing;

Fig. 2 is a similar view showing the air scoop in the upper surface of the wing;

Fig. 3 is a longitudinal sectional view taken on line 3—3 of Fig. 2;

Fig. 4 is a diagrammatic plan view of a portion of an airplane wing structure showing means for operating the air scoop and fuel dump valve independently of one another.

Fig. 5 is a view similar to Fig. 4 showing means for operating the air scoop and fuel dump valve simultaneously;

Fig. 6 is a similar view showing means for operating the air scoop and dump valve successively, the air scoop being opened prior to the dump valve; and Fig. 7 is an enlarged diagrammatic view showing more in detail the structure and operation of the mechanism shown in Fig. 6.

Referring to the drawings and particularly to Fig. 1 thereof, a safety fuel dumping mechanism constructed in accordance with the invention is shown as comprising a fuel tank 10 formed by the upper and lower surfaces 11 and 12 of the airplane wing structure and a wall or partition 13. The tank 10 is provided with a fuel dump valve 14 of usual construction which is maintained closed by a cable 15 and spring 16 but which may be opened in order to discharge fuel in emergencies by means of a cable 17 passing through a packing gland 18 in the partition 13 and around a pulley 19 to the cockpit of the airplane.

An air scoop 20 is hingedly mounted in the lower surface 12 of the wing at a point remote to the tank 10 and dump valve 14 and is normally held closed by a spring 21 which is fixed at one end to a lever arm 22 on the air scoop and at its other end to the partition 13. The air scoop 20 is swung downwardly to its open position, indicated by the broken lines in Fig. 1, and into the slip stream of the wing, when the dump valve 14 is opened, by means of a cable 23 which is fixed to the arm 22 and which passes around a pulley 24 to the cockpit. When the air scoop 20 is opened as described, it will deflect air at relatively high velocity into the wing structure and build up the air pressure therein to a point where it will oppose any tendency for entrained fuel to enter the wing.

In Figs. 2 and 3, the air scoop 20 is shown as being hingedly mounted in upper surface of the wing. In this arrangement the air scoop is opened and closed by means of a member 24' which is threaded on a screw threaded shaft 25 and having a slot and pin connection with an arm 26 on the scoop. One end of shaft 25 is rotatably mounted in a bearing bracket 27 carried by the wing and its other end is threaded into a squared block 28 which is mounted for longitudinal sliding movement in a bracket 29 carried by the wing. The shaft 25 is rotated in order to shift the position of the member 24 and operate the scoop, by means of a pulley 30 which is fixed to the shaft and rotated by a cable 31 leading to the cockpit of the airplane. A lever 32 is pivotally mounted intermediate its ends on the outer face of the bracket 29 and may at times be rocked in a clockwise direction by a cable 33 leading to the cockpit. A cable 34 is fastened to the lower arm of the lever 32 and leads to a fuel dump valve. The lever 32 is so positioned that when the air scoop and dump valve are both closed the block 28 projects into the path of travel of the lever 32 so as to prevent the opening of the dump valve. If, however, it is desired to discharge fuel so as to lighten the load, the pulley 30 and shaft 25 are rotated by the cable 31 until the air scoop 20 is opened to its full extent. The rotation of the shaft 25 moves the block 28 to the left, as viewed in Fig. 3, until it is entirely withdrawn from the path of movement of the lever 32. The lever 32 is now free to be swung by the cable 31 to open the dump valve. By this construction it is made impossible to discharge fuel until after the air scoop has been opened and air pressure built up within the wing.

In Fig. 4 there is shown an arrangement wherein the air scoop 20 and fuel dump valve 14 may be operated independently, if so desired, by means of cables 35 and 36 respectively passing around sheaves 37 and 38 and secured at their inner ends to levers 39 and 40 located adjacent the pilot's seat. As in the structure shown in Fig. 1, the air scoop is urged toward its closed position by a spring 41.

In Fig. 5 there is shown another form of the invention wherein the air scoop 20 and the fuel dump valve 14 are operated simultaneously by cables 42 and 43 passing around sheaves 44 and secured to a single cable 46 which passes around a sheave 47 and secured to an operating lever 48.

In Figs. 6 and 7 a construction is shown in which the air scoop and fuel dump valve are opened in succession by a single operating lever. In this particular construction the air scoop 20 is located on the side of the fuselage and is opened by a cable 49 passing around pulleys 50 and secured to an arm 51 of an operating lever 52. As in the structures previously described, the air scoop is held closed by a spring 41. The fuel dump valve 14 is opened by a cable 53 passing around pulleys 54 and secured to an arm 55 of the lever 52. The arms 51 and 55 are so arranged that when the lever 52 is moved to the right as shown in Fig. 7, the arm 51 immediately exerts a pull upon the cable 49 and opens the air scoop 20. During this movement of the lever 52 the arm 55 is passing over the dead center with respect to the adjacent pulleys 54 and exerts no pull upon the cable 52. However, as soon as the air scoop is opened to its fullest extent, the arm 51 passes over a dead center and exerts no further pull upon the cable 49 but the arm 55 having by this time passed its dead center, now exerts a direct pull upon the cable 53 and opens the dump valve 14.

It will be understood that the above description and accompanying drawings comprehend only the general and preferred embodiment of the invention, and that various other changes in the construction, proportion and arrangement of the parts may be made by those skilled in the art without departing from the nature and scope of the invention as defined in the appended claims.

The invention described herein may be manufactured and/or used by or for the Government of the United States of America for governmental purposes without the payment of any royalties thereon or therefor.

I claim:

1. In an aircraft the interior of which is subject to air pressure less than atmospheric, a fuel tank, a dump valve in said tank adapted to be opened to discharge fuel to lighten the load, a scoop carried by said aircraft, means for extending said scoop to direct air into said aircraft to raise the pressure therein above atmospheric when said valve is opened, thus preventing the entrainment of vaporized fuel of an explosive character into said aircraft, and means interconnecting said valve and scoop to cause said scoop to be extended prior to the opening of said valve.

2. In an aircraft having a closed interior space subject to air pressure less than atmospheric when the aircraft is in flight and in which the presence of vaporized fuel would constitute an explosion hazard, a fuel tank, a dump valve in said tank, means for opening said valve to discharge fuel to lighten the load, a scoop carried by said aircraft, means for extending said scoop to direct air into said interior space to raise the pressure therein above atmospheric when said valve is opened, thus preventing the entrainment and entry of vaporized fuel of an explosive character into said interior space, and means interconnecting said valve and scoop to effect their simultaneous operation.

3. In an aircraft having a closed interior space subject to air pressure less than atmospheric when the aircraft is in flight and in which the presence of vaporized fuel would constitute an explosion hazard, a fuel tank, a dump valve in said tank, means for opening said valve to discharge fuel to lighten the load, a scoop carried by said aircraft, means for extending said scoop to direct air into said interior space to raise the pressure therein above atmospheric when said valve is opened, thus preventing the entrainment and entry of vaporized fuel of an explosive character into said interior space, and means for preventing said valve from opening until said scoop is extended.

WALTER S. DIEHL.